United States Patent
Kim et al.

(10) Patent No.: US 9,632,356 B2
(45) Date of Patent: Apr. 25, 2017

(54) REFLECTION PLATE, BACKLIGHT UNIT, AND LIQUID CRYSTAL DISPLAY INCLUDING THE SAME

(71) Applicant: Samsung Display Co., Ltd., Yongin, Gyeonggi-Do (KR)

(72) Inventors: Kyung Min Kim, Hwaseong-si (KR); Byung Seo Yoon, Hwaseong-si (KR); Hee Kwang Song, Suwon-si (KR)

(73) Assignee: Samsung Display Co., Ltd. (KR)

( * ) Notice: Subject to any disclaimer, the term of this patent is extended or adjusted under 35 U.S.C. 154(b) by 37 days.

(21) Appl. No.: 14/198,435

(22) Filed: Mar. 5, 2014

(65) Prior Publication Data

US 2015/0160512 A1    Jun. 11, 2015

(30) Foreign Application Priority Data

Dec. 5, 2013   (KR) .......................... 10-2013-0150761

(51) Int. Cl.
*G02F 1/1335*   (2006.01)

(52) U.S. Cl.
CPC .. *G02F 1/133605* (2013.01); *G02F 1/133606* (2013.01)

(58) Field of Classification Search
CPC . G02F 1/133605; G02F 1/133606; F21V 7/04
USPC ...................................... 349/61–68
See application file for complete search history.

(56) References Cited

U.S. PATENT DOCUMENTS

| 8,272,773 | B2* | 9/2012 | Nakagome | G02B 6/0053 349/65 |
| 2005/0168968 | A1* | 8/2005 | Lin | C09D 5/004 362/23.18 |
| 2006/0290842 | A1* | 12/2006 | Epstein | G02B 5/0247 349/113 |
| 2009/0262278 | A1* | 10/2009 | Shimizu | H01J 65/046 349/61 |
| 2010/0124046 | A1* | 5/2010 | Kuromizu | G02F 1/133608 362/97.2 |
| 2011/0157516 | A1* | 6/2011 | Nittou | G02F 1/133605 349/62 |
| 2011/0211335 | A1* | 9/2011 | Ko | G02B 6/0046 362/97.1 |
| 2012/0250293 | A1* | 10/2012 | Jeong | G02F 1/133615 362/97.2 |

FOREIGN PATENT DOCUMENTS

| JP | 2006-189519 A | 7/2006 |
| JP | 2009-232963 A | 10/2009 |
| JP | 2010-257852 A | 11/2010 |
| JP | 4977021 B2 | 7/2012 |
| KR | 1996-0010625 A | 4/1996 |
| KR | 2004-0083891 A | 10/2004 |
| KR | 2013-0067740 A | 6/2013 |

* cited by examiner

*Primary Examiner* — Charles Chang
(74) *Attorney, Agent, or Firm* — Innovation Counsel LLP

(57) ABSTRACT

Reflection plate, backlight unit and liquid crystal display are provided. In one aspect, there is provided a reflection plate comprising a bottom portion and a side wall portion that extends from circumferences of the bottom portion, wherein an upper surface of the bottom portion includes a diffusion reflection surface and an inner surface of the side wall portion includes a mirror reflection surface.

10 Claims, 11 Drawing Sheets

REFLECTION PLATE, BACKLIGHT UNIT, AND LIQUID CRYSTAL DISPLAY INCLUDING THE SAME

CROSS-REFERENCE TO RELATED APPLICATIONS

This application is based on and claims priority from Korean Patent Application No. 10-2013-0150761, filed on Dec. 5, 2013 in the Korean Intellectual Property Office, the disclosure of which is incorporated herein in its entirety by reference.

BACKGROUND

1. Field

The present application relates to a reflection plate, a backlight unit, and a liquid crystal display including the same.

2. Description of the Prior Art

A liquid crystal display includes a liquid crystal display module that is connected to an external case. The liquid crystal display module includes a liquid crystal panel that is composed of two substrates between which a liquid crystal layer is interposed, and a backlight unit that is positioned in the rear of the liquid crystal panel to supply light to the liquid crystal layer. The liquid crystal panel displays an image through adjustment of permeability of light that is provided from the backlight unit.

The backlight unit is classified into a direct type and a photometric type depending on the position of light sources. In the direct type backlight unit, light sources are provided in the rear of a display panel, and in the photometric type backlight unit, light sources are provided on one side of a rear portion of the display panel.

The direct type backlight unit requires a reflection plate to uniformly transfer light that is emitted from the light sources to the display panel. In this case, if the light emitted from the light sources is directed to a diffusion plate that is arranged on an upper portion of the reflection plate, or if the light is reflected from a side wall of the reflection plate and is directed to the diffusion plate with an incident angle of almost 90 degrees, light leakage may be visually recognized on the display device. Accordingly, various technical attempts have been made to solve this problem through adjustment of paths of light irradiated from the light sources.

SUMMARY

Accordingly, one embodiment provides a reflection plate, which can prevent light leakage from being visually recognized at an edge portion of a display device.

Another embodiment provides a backlight unit, display device, which can prevent light leakage from being visually recognized at an edge portion of a display device.

Still another embodiment provides a liquid crystal display, which can prevent light leakage from being visually recognized at an edge portion of the display device.

Additional features will be set forth in part in the description which follows and in part will become apparent to those having ordinary skill in the art upon examination of the following or may be learned from practice of the inventive concept.

In one aspect, there is provided a reflection plate comprising a bottom portion and a side wall portion that extends from circumferences of the bottom portion. An upper surface of the bottom portion includes a diffusion reflection surface and an inner surface of the side wall portion includes a mirror reflection surface.

In another aspect, there is provided a backlight unit comprising a reflection plate including a bottom portion and a side wall portion that extends from circumferences of the bottom portion and a light source portion arranged on an upper portion of the reflection plate. An upper surface of the bottom portion includes a diffusion reflection surface and an inner surface of the side wall portion includes a mirror reflection surface.

In another aspect, there is provided a liquid crystal display comprising a backlight unit, a diffusion plate, and a display panel. The backlight unit includes a reflection plate and a light source portion arranged on an upper portion of the reflection plate. The diffusion plate is arranged on an upper portion of the backlight unit. The display panel is arranged on an upper portion of the diffusion plate. The reflection plate includes a bottom portion and a side wall portion that extends from circumferences of the bottom portion, and an upper surface of the bottom portion includes a diffusion reflection surface and an inner surface of the side wall portion includes a mirror reflection surface.

According to the embodiments, at least the following effects can be achieved.

That is, the light leakage can be prevented from being visually recognized on the display device through adjustment of the paths of the light irradiated from the light source portion.

Further, uniform light can be provided to the whole region of the display device through adjustment of the reflection aspects of the side wall portion and the bottom portion in different manners.

Further, the whole light emitting luminance can be improved through making the side wall portion include the mirror reflection surface.

The effects according to the inventive concept are not limited to the contents as exemplified above, but further various effects are included in the description.

BRIEF DESCRIPTION OF THE DRAWINGS

The above and other features of the inventive concept will be more apparent from the following detailed description taken in conjunction with the accompanying drawings, in which.

DETAILED DESCRIPTION OF THE EMBODIMENTS

Figure 1:
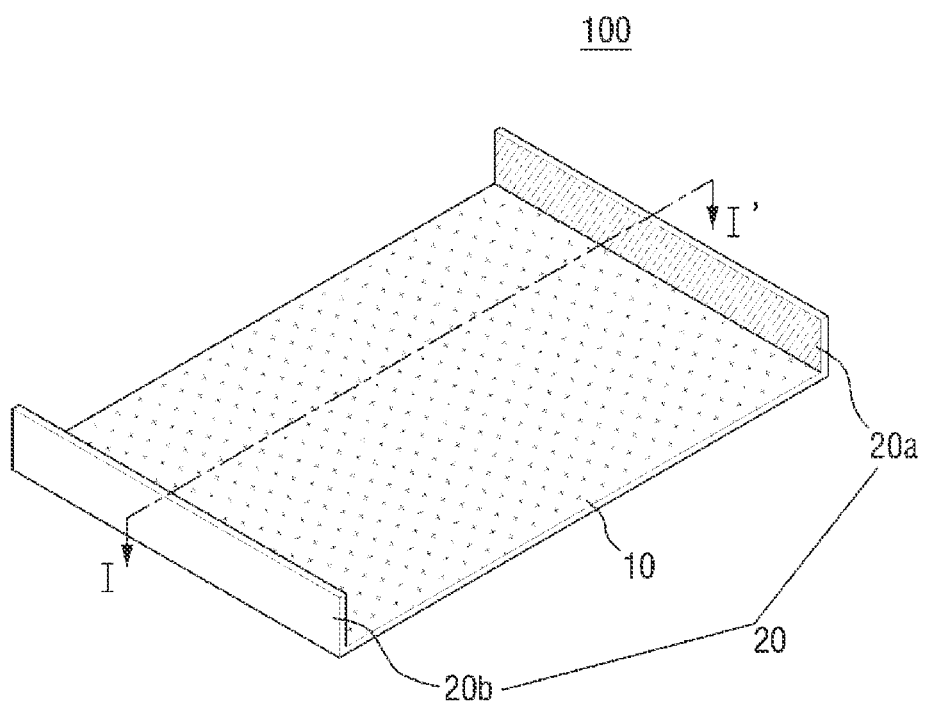
FIG. 1 is a perspective view of a reflection plate according to an embodiment.

The aspects and features of the inventive concept and methods for achieving the aspects and features will be apparent by referring to the embodiments to be described in detail with reference to the accompanying drawings. However, the inventive concept is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the inventive concept, and the inventive concept is only defined within the scope of the appended claims.

The term "on" that is used to designate that an element is on another element or located on a different layer or a layer includes both a case where an element is located directly on another element or a layer and a case where an element is located on another element via another layer or still another element. In the entire description, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments will be described with reference to the accompanying drawings.

Figure 2:
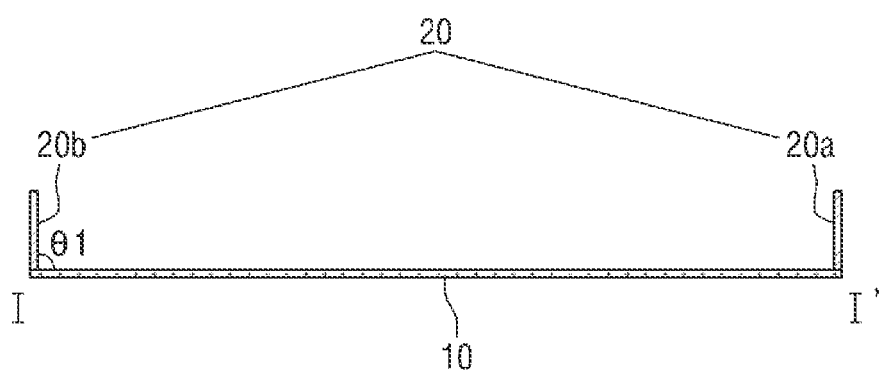
FIG. 2 is a cross-sectional view taken along line I-I' of FIG. 1.

FIG. 1 is a perspective view of a reflection plate according to an embodiment, and FIG. 2 is a cross-sectional view taken along lint I-I' of FIG. 1.

Referring to FIGS. 1 and 2, a reflection plate 100 according to an embodiment includes a bottom portion 10, and a side wall portion 20 that is bent and extends from circumferences of the bottom portion 10.

The bottom portion 10 is a plate-shaped member, and may serve to provide a space in which light sources to be described later are arranged. In an exemplary embodiment, the bottom portion 10 may be in a sheet shape or in a film shape. Further, the bottom portion 10 may have a single-layer structure, but is not limited thereto. The bottom portion 10 may have a structure in which two or more layers are stacked.

In an exemplary embodiment, the bottom portion 10 may be in a rectangular shape including four sides, but is not limited thereto. The bottom portion 10 may be in a circular shape or in a shape that includes a curve at least partly.

The bottom portion 10 may be formed of plastic, synthetic resin, or an equivalent material. In an exemplary embodiment, the bottom portion 10 may be made of polyethylenetherephthalate (PET). However, this is merely exemplary, and the material of the bottom portion 10 is not limited thereto.

An upper surface of the bottom portion 10 may be a flat surface, but is not limited thereto. That is, various patterns for guiding scattering or diffusion of light that is irradiated onto the bottom portion 10 may be formed on an upper surface of the bottom portion 10. In an exemplary embodiment, at least one uneven pattern may be formed on the upper surface of the bottom portion 10. However, the kind of patterns formed on the upper surface of the bottom portion 10 is not limited thereto.

The upper surface of the bottom portion 10 may include a diffusion reflection surface at least partly. In the description, "diffusion reflection" may mean that light, which is incident to a surface of a material, is reflected not only in the reflection direction of a mirror surface but also in all directions outside the surface of the material. The light that is incident to the diffusion reflection surface is scattered and may travel in at least one direction. That is, the diffusion reflection may include the diffusion reflection as the dictionary meaning thereof. FIG. 1 exemplarily illustrates that the overall upper surface of the bottom portion 10 is the diffusion reflection surface, but is not limited thereto. Only a part of the upper surface of the bottom portion 10 may be the diffusion reflection surface.

In an exemplary embodiment, in order for the upper surface of the bottom portion 10 to include the diffusion reflection surface, the upper surface of the bottom portion 10 may be white. For this, white pigment, such as titanium dioxide, may be spread on the upper surface of the bottom portion 10, but is not limited thereto. That is, in another exemplary embodiment, for the diffusion reflection, on the upper surface of the bottom portion 10, ink having specific optical characteristic may be spread, or a separate coating layer may be formed. Further, a plurality of sheets having different refractive indices may be arranged to be stacked. However, this is merely exemplary, and the method for forming the diffusion reflection surface is not limited thereto. A mirror refection surface may be formed on the upper surface of the bottom portion 10 using various optical methods or materials. Light reflection aspects in the case where the upper surface of the bottom portion 10 is formed as the diffusion reflection surface will be described in detail later.

As described above, the reflection plate 100 according to an embodiment may include a side wall portion 20 that is bent and extends from the circumferences of the bottom portion 10.

The side wall portion 20 may extend from an end portion of the bottom portion 10 toward the upper portion of the bottom portion 10. In other words, the side wall portion 20 may be formed to be upwardly inclined from the end portion of the bottom portion 10, or may be formed to extend vertically upward from the end portion of the bottom portion 10. In other words, the side wall portion 20 may be formed to be bent and extend from the circumferences of the bottom portion 10.

The side wall portion 20, which is formed to be bent and extend from the bottom portion 10, may be formed in a body with the bottom portion 10. That is, the side wall portion 20 and the bottom portion 10 may be formed of substantially the same material. In an exemplary embodiment in which the bottom portion 10 is made of polyethylenetherephthalate (PET), the side wall portion 20 may also be made of polyethylenetherephthalate (PET) like the bottom portion 10. However, this is merely exemplary, and the material of the bottom portion 10 and the side wall portion 20 is not limited thereto. The bottom portion 10 and the side wall portion 20 may be independently formed as separate configurations. In an exemplary embodiment in which the bottom portion 10 is in a rectangular shape, the width of the side wall portion 20 may be substantially the same as the width of one side of the bottom portion 10. That is, the width of the side wall portion 20 may be substantially the same as the width of one side of the bottom portion 10 that is most adjacent to or comes in contact with the side wall portion 20.

The inner surface of the side wall portion 20 may include a mirror reflection surface. In the description, the mirror reflection means that an incident angle and a reflection angle of light are equal to each other and the light that is reflected from the surface of an object travels in one direction, and may have the same meaning as specular reflection.

That is, the light that is incident to the mirror reflection surface may have the same reflection angle as the incident angle, and may be reflected and travel in one direction.

In order to include a mirror reflection surface, the inner surface of the side wall portion 20 may be formed to include metal, such as silver (Ag) or aluminum (Al). That is, on the inner surface of the side wall portion 20, a material, such as silver (Ag) or aluminum (Al), may be spread, or a separate coating layer for the mirror reflection may be formed. However, this is merely exemplary, and the formation of the mirror reflection surface is not limited thereto. The mirror reflection surface may be formed on the inner surface of the side wall portion 20 using various optical methods or materials. The light reflection aspects in the case where the inner surface of the side wall portion 20 is formed as the diffusion reflection surface will be described in detail later.

FIG. 1 exemplarily illustrates that the whole inner surface of the side wall portion 20 is the mirror reflection surface, but is not limited thereto. That is, only a part of the inner surface of the side wall portion 20 may be the mirror reflection surface. The side wall portion 20 may include a first side wall 20a and a second side wall 20b that face each other. In an exemplary embodiment in which the bottom portion 10 is in a rectangular shape, the first side wall 20a and the second side wall 20b may be formed to extend from two opposite sides of the bottom portion 10. For convenience in explanation, the two opposite sides of the bottom portion 10 are called a first side and a second side. Based on this, the first side wall 20a may be formed to be bent and extend from the first side, and the second side wall 20b may be formed to be bent and extend from the second side. In an exemplary embodiment, the first side and the second side are parallel to each other, and the first side wall 20a and the second side wall 20b are parallel to each other, but are not limited thereto. Further, the width of the first side wall 20a and the second side wall 20b may substantially the same as the width of the first side and the second side.

In an exemplary embodiment, the interior angle that is formed by the inner surfaces of the first side wall 20a and the second side wall 20b and the upper surface of the bottom portion 10 may be a right angle. For convenience in explanation, the interior angle that is formed by the inner surfaces of the first side wall 20a and the second side wall 20b and the upper surface of the bottom portion 10 is called a first angle $\theta 1$. In an exemplary embodiment, the first angle $\theta 1$ that is formed by the inner surfaces of the first side wall 20a and the second side wall 20b and the upper surface of the bottom portion 10 may be a right angle, i.e., 90°. That is, the inner surfaces of the first side wall 20a and the second side wall 20b and the upper surface of the bottom portion 10 may be arranged to be substantially vertical to each other. However, the present embodiment is not limited thereto, and in another exemplary embodiment, the first angle $\theta 1$ may be an acute angle or an obtuse angle.

If the inner surfaces of the first side wall 20a and the second side wall 20b and the upper surface of the bottom portion 10 are substantially vertical to each other, light that is irradiated from the light source portion arranged on the upper surface of the bottom portion 10 onto the side wall portion 20 has an incident angle that is approximately 90 degrees, and is prevented from traveling to the upper portion of the bottom portion 10. In other words, as the interior angle that is formed by the reflection direction of the light that is irradiated from the light source portion to the side wall portion 20 and the upper surface of the bottom portion 10 becomes closer to 90 degrees, light leakage may be visually recognized at an edge portion of the display device. In the case where the inner surfaces of the first side wall 20a and the second side wall 20b and the upper surface of the bottom portion 10 are arranged to be substantially vertical to each other, the internal angle that is formed by the upper surface of the bottom portion 10 and the reflection direction of the light, which is emitted from the light sources in the side direction and is reflected from the surfaces of the first side wall 20a and the second side wall 20b, becomes less than 90 degrees, and thus the light leakage that may occur at the edge portion of the display device can be prevented. That is, the light emitted from the light sources can be relatively uniformly provided to the display panel. In other words, when the light, which is reflected by the side wall portion 20, is irradiated onto the diffusion plate to be described later, the incident angle of the light is lowered to reduce the quantity of light that directly passes through the diffusion plate, and thus the light leakage is prevented from being visually recognized from the outside of the display device.

Figure 3:
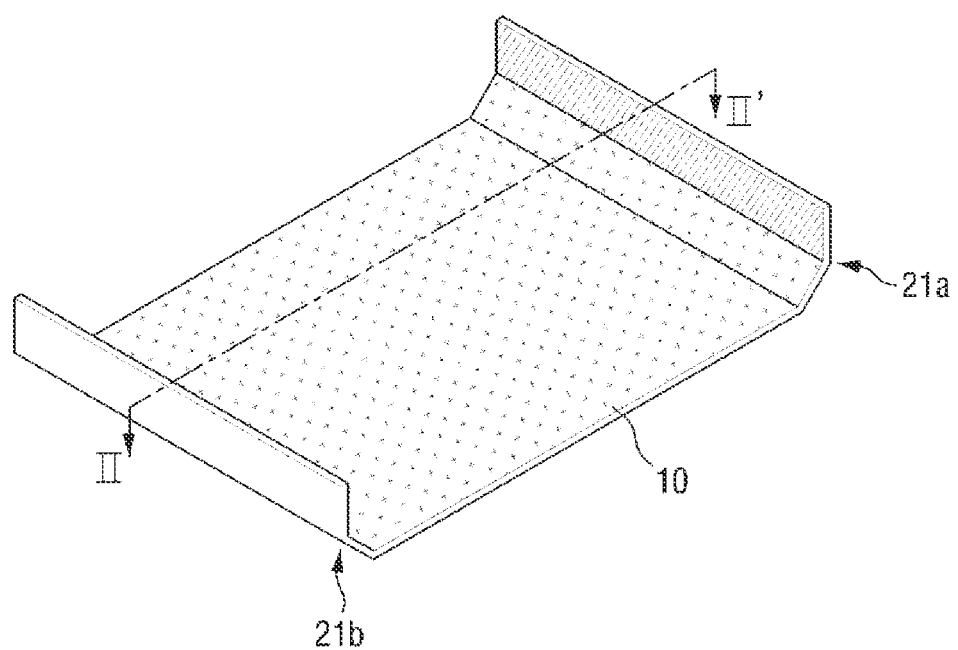
FIG. 3 is a perspective view of a reflection plate according to another embodiment.
Figure 4:
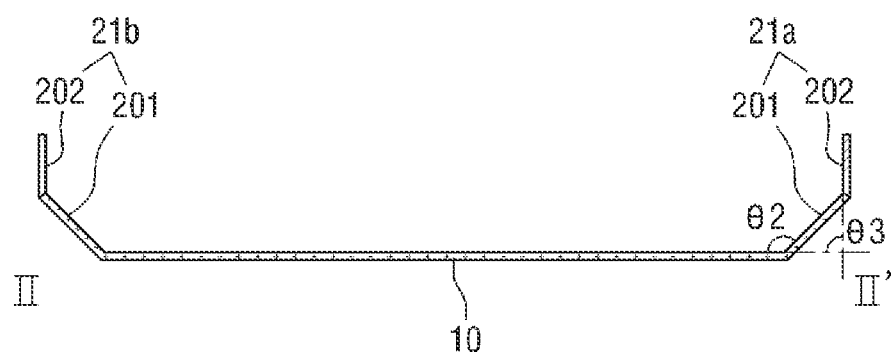
FIG. 4 is a cross-sectional view taken along line II-II' of FIG. 3.

FIG. 3 is a perspective view of a reflection plate 101 according to another embodiment, and FIG. 4 is a cross-sectional view taken along line II-II' of FIG. 3.

Referring to FIG. 3, the reflection plate 101 according to another embodiment is different from the reflection plate 100 according to the embodiment of FIG. 1 on the point that a first side wall 21a and a second side wall 21b include a first sub-side wall 201 and a second sub-side wall 202.

In an exemplary embodiment, the first side wall 21a and the second side wall 21b may include the first sub-side wall 201 and the second sub-side wall 202. For convenience in explanation, the first sub-side wall 201 and the second sub-side wall 202 of the first side wall 21a will be described. Since the first sub-side wall 201 and the second sub-side wall 202 of the second side wall 21b are substantially the same as the first sub-side wall 201 and the second sub-side wall 202 of the first side wall 21a, the explanation thereof will be omitted.

The first sub-side wall 201 may be formed to be bent and extend from the bottom portion 10. The internal angle that is formed by the inner surface of the first sub-side wall 201 and the upper surface of the bottom portion 10, that is, the second angle $\theta 2$, may be an obtuse angle. FIG. 3 exemplarily illustrates that the second angle $\theta 2$ is an obtuse angle, but is not limited thereto. That is, in another exemplary embodiment, the second angle $\theta 2$ may be an acute angle or a right angle.

The width of the first sub-side wall 201 may be substantially equal to the width of one side of the bottom portion 10 that comes in contact with the first sub-side wall 201. In an exemplary embodiment, the inner surface of the first sub-side wall 201 may include a diffusion reflection surface. FIG. 3 exemplarily illustrates that the overall inner surface of the first sub-side wall 201 is the diffusion reflection surface, but is not limited thereto. Only a part of the inner surface of the first sub-side wall 201 may be the diffusion reflection surface. In an exemplary embodiment, in order for the inner surface of the first sub-side wall 201 to include the diffusion reflection surface, the inner surface of the first sub-side wall 201 may be white.

For this, white pigment, such as titanium dioxide, may be spread on the inner surface of the first sub-side wall 201, but is not limited thereto. In another exemplary embodiment, for the diffusion reflection, on the inner surface of the first sub-side wall 201, ink having specific optical characteristic may be spread, or a separate coating layer may be formed. However, this is merely exemplary, and the method for forming the diffusion reflection surface is not limited thereto. That is, the diffusion reflection surface may be formed on the inner surface of the first sub-side wall 201 using various optical methods or materials.

The inner surface of the first sub-side wall 201 may be a flat surface, but is not limited thereto. That is, various patterns for guiding the scattering or diffusion of light that is irradiated onto the inner surface of the first sub-side wall 201 may be formed on the inner surface of the first sub-side wall 201. In an exemplary embodiment, at least one uneven pattern may be formed on the inner surface of the first sub-side wall 201. However, this is merely exemplary, and the kind of patterns formed on the inner surface of the first sub-side wall 201 is not limited thereto.

The second sub-side wall 202 may be formed to extend from an upper end of the first sub-side wall 201. That is, the second sub-side wall 202 may extend from the upper end of the first sub-side wall 201, or may be bent and extend from the upper end of the first sub-side wall 201.

The angle that is formed by the extending surface of the inner surface of the second sub-side wall 202 and the extending surface of the upper surface of the bottom portion 10, that is, a third angle θ3, may be a right angle. FIG. 3 exemplarily illustrates that the third angle θ3 is substantially the right angle, but is not limited thereto. The third angle θ3 may be an acute angle or an obtuse angle. Further, in another exemplary embodiment, the second angle θ2 and the third angle θ3 may be substantially equal to each other. In this case, the inner surfaces of the first sub-side wall 201 and the second sub-side wall 202 may be arranged on the same plane.

The width of the second sub-side wall 202 may be substantially equal to the width of the upper end of the first sub-side wall 201. In an exemplary embodiment in which the width of the first sub-side wall 201 is equal to one side of the bottom portion 10, the width of the second sub-side wall 202 may be substantially equal to the width of one side of the bottom portion 10.

In an exemplary embodiment, the inner surface of the second sub-side wall 202 may include a mirror reflection surface. FIG. 3 exemplarily illustrates that the overall inner surface of the second sub-side wall 202 is the diffusion reflection surface, but is not limited thereto. Only a part of the inner surface of the second sub-side wall 202 may be the diffusion reflection surface.

In an exemplary embodiment, in order for the inner surface of the second sub-side wall 202 to include the diffusion reflection surface, the inner surface of the second sub-side wall 202 may be formed to include metal, such as silver (Ag) or aluminum (Al). That is, on the inner surface of the second sub-side wall 202, a material, such as silver (Ag) or aluminum (Al), may be spread, or a separate coating layer for the mirror reflection may be formed. However, this is merely exemplary, and the formation of the mirror reflection surface is not limited thereto. The mirror reflection surface may be formed on the inner surface of the second sub-side wall 202 using various optical methods or materials.

Figure 5:
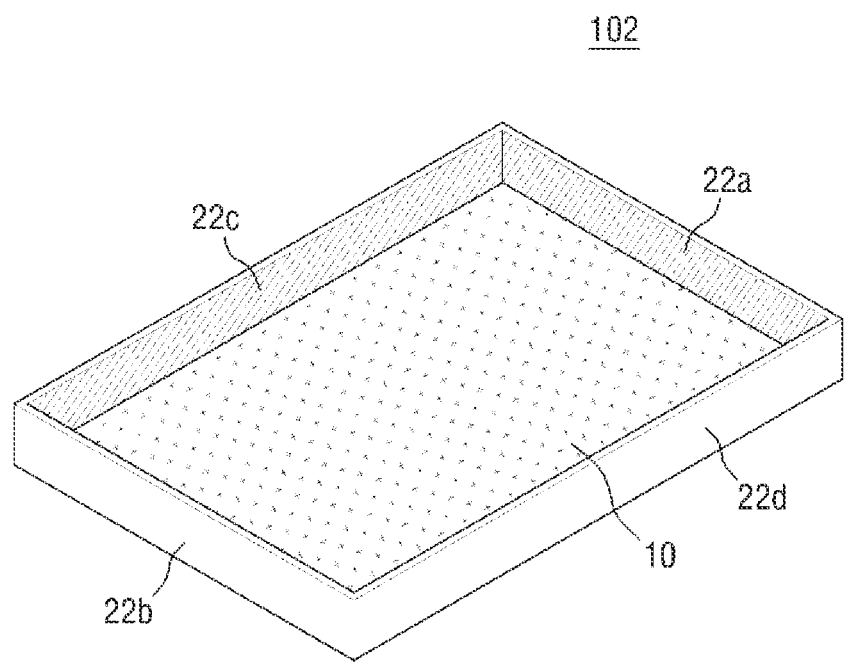
FIG. 5 is a perspective view of a reflection plate according to still another embodiment.

FIG. 5 is a perspective view of a reflection plate 102 according to still another embodiment. Referring to FIG. 5, the reflection plate 102 according to still another embodiment is different from the reflection plate 100 according to the embodiment of FIG. 1 on the point that the reflection plate 102 according to still another embodiment includes first to fourth side walls 22a, 22B, 22C, 22d.

In an exemplary embodiment, the reflection plate 102 may include first to fourth side walls 22a to 22d. That is, in an exemplary embodiment in which the bottom portion 10 is in a rectangular shape, the reflection plate 102 may include the first side wall 22a and the second side wall 22b, which face each other, and the third side wall 22c and the fourth side wall 22d, which face each other and of which both ends are adjacent to or come in contact with the first side wall 22a and the second side wall 22b. That is, the inner surface of the third side wall 22c and the inner surface of the fourth side wall 22d may face each other, and both ends of the third side wall 22c and the fourth side wall 22d may be arranged to come in contact with or to be adjacent to both ends of the first side wall 22a and the second side wall 22b. That is, in an exemplary embodiment in which the bottom portion 10 has the first side and the second side, which face each other, and the third side and the fourth side, which face each other, the first to fourth side walls 22a to 22d may be formed to extend from the first to fourth sides. In an exemplary embodiment, the angle that is formed by the inner surfaces of the first side wall 22a and the fourth side wall 22d and the upper surface of the bottom portion 10 may be substantially a right angle, but is not limited thereto. The interior angle that is formed by the inner surfaces of the first side wall 22a and the fourth side wall 22d and the upper surface of the bottom portion 10 may be an acute angle or an obtuse angle.

In an exemplary embodiment, the width of the first to fourth side walls 22a to 22d may be substantially equal to the width of the corresponding first to fourth sides of the reflection plate, but is not limited thereto. The width of the inner surfaces of the first to fourth side walls 22a to 22d may be larger than or may be smaller than the width of the first to fourth sides depending on the angle that is formed by the inner surfaces of the first to fourth side walls 22a to 22d and the upper surface of the bottom portion 10.

The inner surfaces of the first to fourth side walls 22a to 22d may include a mirror reflection surface. Since this feature is substantially the same as those of the first side wall 20a and the second side wall 20b according to the embodiment of FIG. 1, the detailed explanation thereof will be omitted.

Figure 6:
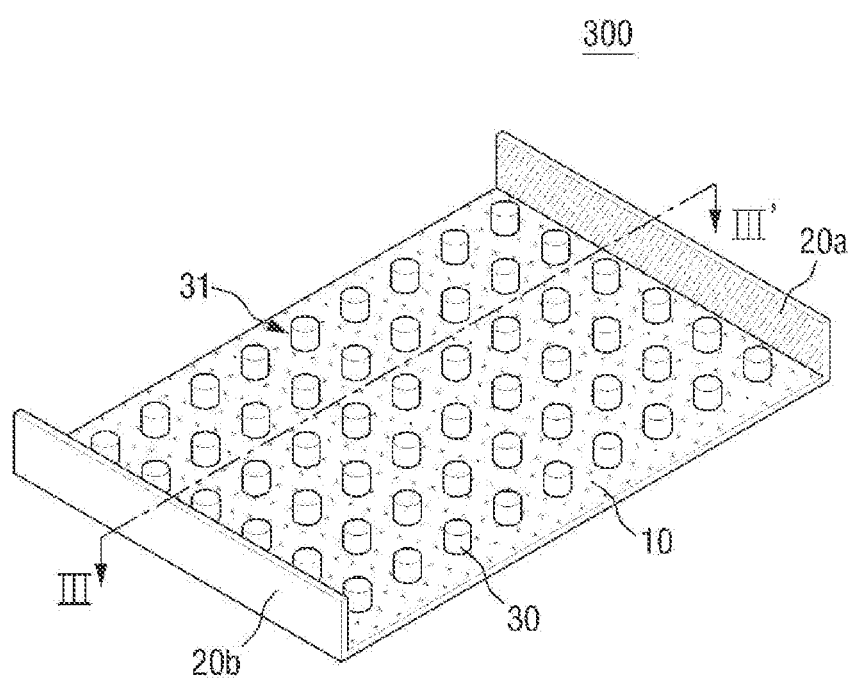
FIG. 6 is a perspective view of a backlight unit according to an embodiment.
Figure 7:
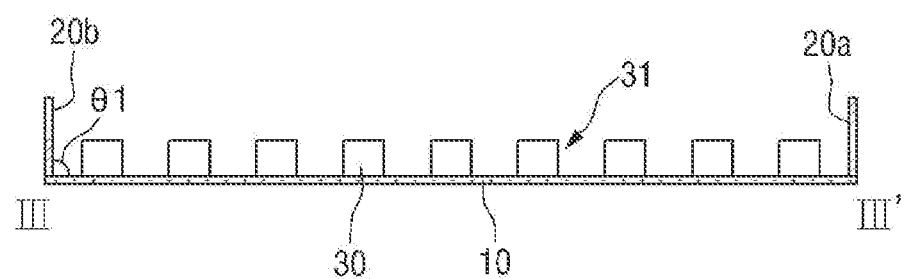
FIG. 7 is a cross-sectional view taken along line III-III' of FIG. 6.
Figure 8:
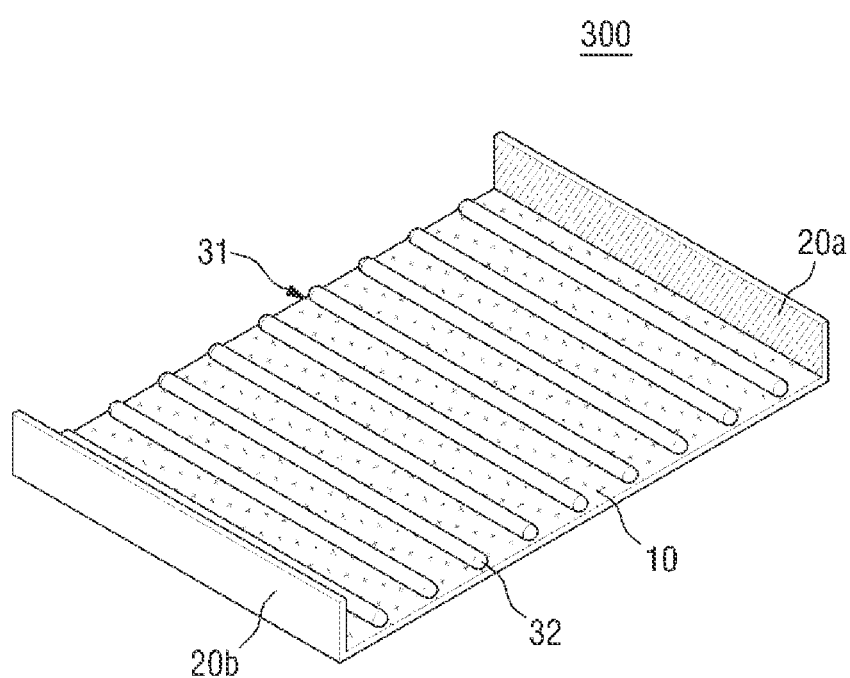
FIG. 8 is a perspective view of a backlight unit according to a modified embodiment of FIG. 6.

FIG. 6 is a perspective view of a backlight unit 300 according to an embodiment, and FIG. 7 is a cross-sectional view taken along line III-III' of FIG. 6. FIG. 8 is a perspective view of a backlight unit according to a modified embodiment of FIG. 6.

Referring to FIGS. 6 and 7, a backlight unit 300 according to an embodiment includes a reflection plate and a light source portion that is arranged on an upper surface of the reflection plate, and the reflection plate includes a bottom portion 10 and a side wall portion 20 that is bent and extends from the circumferences of the bottom portion 10.

In the backlight unit 300 according to an embodiment, the reflection plate may be substantially the same as the reflection plate according to some embodiments as described above. Accordingly, the detailed explanation thereof will be omitted.

The backlight unit 300 according to an embodiment may include a light source portion 31 that is arranged on an upper portion of the reflection plate. The light source portion 31 may include at least one light source. FIG. 6 exemplarily illustrates that the light source portion 31 includes a plurality of point light sources 30 that are arranged in the form of a matrix having a plurality of rows and columns. However, this is merely exemplary, and the shape and arrangement of the light source portion 31 are not limited thereto. That is, in another exemplary embodiment, the plurality of point light sources 30 may be sparsely arranged in an irregular shape.

Further, in another exemplary embodiment, the light source portion 31 may include a plurality of line light sources 32 that are arranged in parallel to each other (see FIG. 8).

That is, the light source portion 31 of the backlight unit according to some embodiments may selectively include any one of the point light sources illustrated in FIG. 6 and the line light sources illustrated in FIG. 8.

In an exemplary embodiment, the light source portion 31 may include cold-cathode fluorescent lamps (CCFLs) or external electrode fluorescent lamps (EEFLs). However, this is merely exemplary, and the kind of light source portion 31 is not limited thereto.

Further, the light source portion 31 may include upper surface light emission type light sources emitting light upward and/or side surface light emission type light sources emitting light sideward. In an exemplary embodiment in which the light source portion 31 includes side surface light emission type light sources and the inner surface of the side wall portion 20 is vertical to the upper surface of the bottom portion, light that is irradiated from the side surface light emission type light sources is reflected from the inner surface of the side wall portion 20, and the reflection angle may approach 90 degrees. In other words, the light that is reflected from the inner surface of the side wall portion 20 may be incident toward the inner surface of another side wall portion 20 or toward the upper surface of the bottom portion 10. Through this, the light irradiated from the light source portion 31 is prevented from being irradiated onto the upper portion of the reflection plate 100 in a concentrated state, and the visual recognition of the light leakage that occurs due to such light concentration is suppressed. That is, a uniform quantity of light can be provided to the whole region of the display panel through dispersion of the light.

The light source portion 31 may be arranged on the upper surface of the bottom portion 10 of the reflection plate. That is, the light source portion 31 may be arranged to be adjacent to or to come in contact with the upper surface of the bottom portion 10.

The light that is irradiated from the light source portion 31 may be irradiated onto and may be diffusion-reflected from the bottom portion 10, or may be irradiated onto and may be mirror-reflected from the side wall portion 20. Further, the light that is irradiated from the light source portion 31 may be mirror-reflected or diffusion-reflected by the upper surface of the bottom portion 10 or the inner surface of the side wall portion 20, travel toward the upper portion of the reflection plate, and be provided to the display panel to be described later.

Light reflection aspects in the case where the light that is irradiated from the light source portion 31 is reflected from the upper surface of the bottom portion 10 or the inner surface of the side wall portion 20 will be described in detail with reference to FIG. 9.

Figure 9:
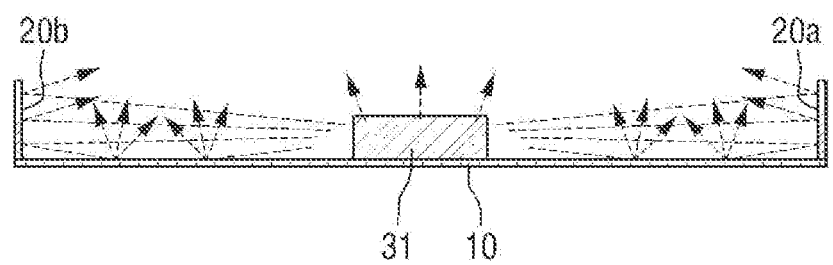
FIG. 9 is a cross-sectional view of a backlight unit according to the embodiment of FIG. 6.

FIG. 9 is a cross-sectional view of a backlight unit 300 according to the embodiment of FIG. 6. Referring to FIG. 9, the light that is irradiated from the light source portion 31 may be incident to the inner surface of the side wall portion 20 or the upper surface of the bottom portion 10. For convenience in explanation, FIG. 9 exemplarily illustrates the light source portion 31, but the shape of the light source portion 31 is not limited thereto.

The light that is irradiated from the light source portion 31 may be irradiated onto the upper surface of the bottom portion 10, the inner surface of the side wall portion 20, or the upper portion of the reflection plate. Specifically, the light that is incident to the upper surface of the bottom portion 10 may be scattered or diffusion-reflected. The light that reaches and is diffusion-reflected from the upper surface of the bottom portion 10 may travel toward the upper portion of the reflection plate. That is, the reflected light may travel toward the diffusion plate to be described later. The light that is diffusion-reflected from the upper surface of the bottom portion 10 and travels toward the diffusion plate may be reflected again to the lower portion of the diffusion plate or may be provided to the display panel that is arranged on the upper portion of the diffusion plate through penetrating the diffusion plate.

The light that is incident from the light source portion 31 to the inner surface of the side wall portion 20 may be mirror-reflected. The light that is reflected from the light source portion 31 and is incident to the inner surface of the side wall portion 20 may be reflected again toward the light source portion 31, the side wall portion 20, the upper portion of the reflection plate, or the upper surface of the bottom portion 10. The light that travels toward the diffusion plate may be reflected again to be directed to the upper surface of the bottom portion 10 or the inner surface of the side wall portion 20, or may be provided to the display panel that is arranged on the upper portion of the diffusion plate through penetrating the diffusion plate. That is, the mirror reflection and the diffusion reflection of the light are mixed by the reflection plate, specifically, by the inner surface of the side wall portion 20 and the upper surface of the bottom portion 10, and thus relatively uniform light can be equally transferred to the whole region of the display panel to be described later. That is, the light leakage that occurs due to concentration of the light on the edge portion of the display panel can be suppressed.

Figure 10:
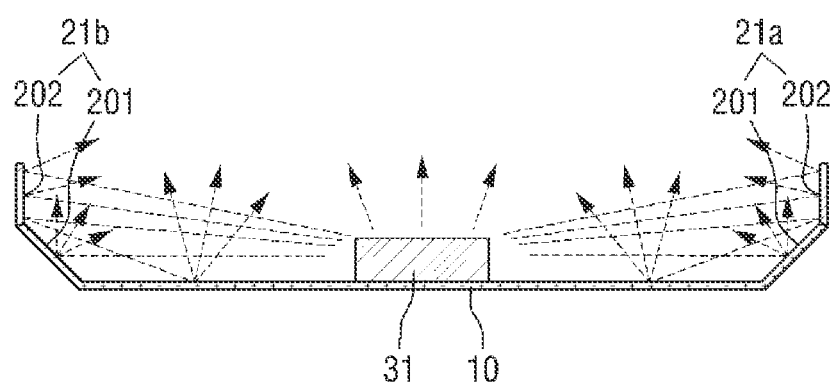
FIG. 10 is a cross-sectional view of a backlight unit according to another embodiment.

FIG. 10 is a cross-sectional view of a backlight unit according to another embodiment. Referring to FIG. 10, the backlight unit according to another embodiment is different from the backlight unit according to the embodiment of FIG. 9 on the point that the backlight unit according to another embodiment adopts the reflection plate of FIG. 3.

As described above, the first side wall 21a and the second side wall 21b may include the first sub-side wall 201 and the second sub-side wall 202.

Further, the inner surface of the first sub-side wall 201 may include a diffusion reflection surface, and the inner surface of the second sub-side wall 202 may include a mirror reflection surface.

The light that is irradiated from the light source portion 31 may be irradiated onto the upper surface of the bottom portion 10, the inner surface of the first sub-side wall 201, the inner surface of the second sub-side wall 202, or the upper portion of the reflection plate. Specifically, the light that is incident to the upper surface of the bottom portion 10 may be scattered or diffusion-reflected. The light that reaches and is diffusion-reflected from the upper surface of the bottom portion 10 may travel toward the upper portion of the reflection plate. That is, the reflected light may travel toward the diffusion plate (not illustrated) to be described later. The light that is diffusion-reflected from the upper surface of the bottom portion 10 and travels toward the diffusion plate may be reflected again and may be directed to the upper surface of the bottom portion 10 or the inner surface of the side wall portion or may be provided to the display panel that is arranged on the upper portion of the diffusion plate through penetrating the diffusion plate.

The light that is incident to the inner surface of the first sub-side wall 201 may be scattered or may be diffusion-reflected. That is, at least a part of the light that is incident to the inner surface of the first sub-side wall 201 may be diffusion-reflected and travel toward the upper portion of the reflection plate. In other words, at least a part of the light that is incident to the inner surface of the first sub-side wall 201 may be diffusion-reflected and travel toward the diffusion plate, and a part of the light that travels toward the diffusion plate may be reflected again to the lower portion of the diffusion plate, or may be provided to the display panel that is arranged on the upper portion of the diffusion plate through penetrating the diffusion plate.

The light that is incident to the inner surface of the second sub-side wall 202 may be mirror-reflected. That is, the light that is reflected from the light source portion 31 or the bottom portion 10 and is incident to the inner surface of the second sub-side wall 202 may be reflected again toward the light source portion 31, the side wall portion, the upper portion of the reflection plate, or the upper surface of the bottom portion 10. The light that travels toward the upper portion of the reflection plate may be reflected by the diffusion plate that is arranged on the upper portion of the reflection plate to be directed to the lower portion of the reflection plate, or may be provided to the display panel that is arranged on the upper portion of the diffusion plate through penetrating the diffusion plate.

That is, since the mirror reflection and the diffusion reflection of the light are mixed by the first sub-side wall 201, the second sub-side wall 202, and the upper surface of the bottom portion 10, relatively uniform light can be equally transferred to the whole region of the display panel to be described later. That is, the light leakage that occurs due to concentration of the light on the edge portion of the display panel can be suppressed.

Figure 11:
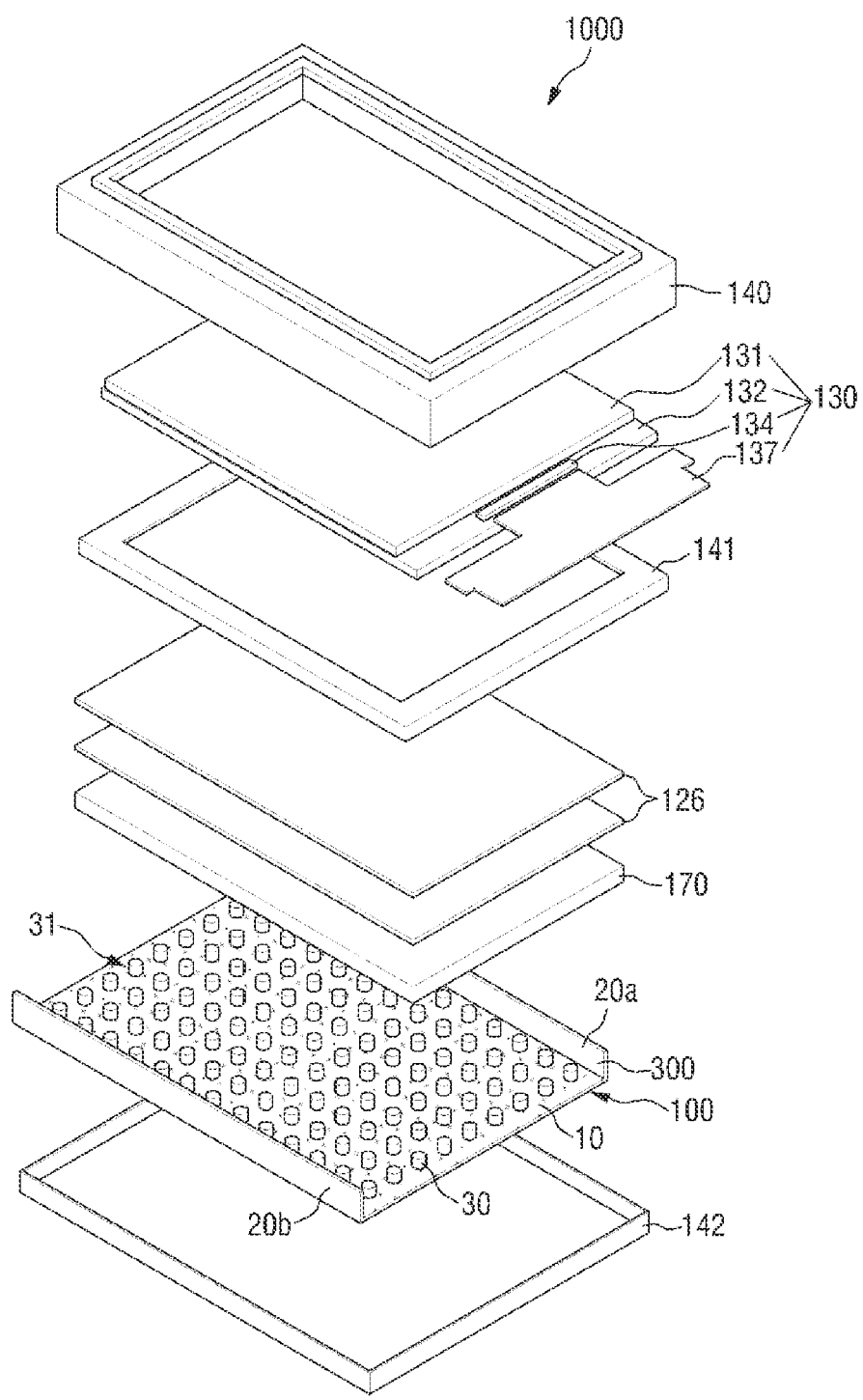
FIG. 11 is an exploded perspective view of a liquid crystal display according to an embodiment.

FIG. 11 is an exploded perspective view of a liquid crystal display 1000 according to an embodiment.

Referring to FIG. 11, the liquid crystal display 1000 according to an embodiment includes a backlight unit 300 that includes a reflection plate 100 and a light source portion 31 arranged on an upper portion of the reflection plate 100, a diffusion plate 170 arranged on an upper portion of the backlight unit 300, and a display panel 130 arranged on an upper portion of the diffusion plate 170. The reflection plate 100 includes a bottom portion 10 and a side wall portion 20 that is bent and extends from circumferences of the bottom portion 10.

In the liquid crystal display 1000 according to an embodiment, the backlight unit 300 may be substantially the same as the backlight unit 300 according to some embodiments as described above. Accordingly, the detailed explanation thereof will be omitted.

The liquid crystal display 1000 according to an embodiment may further include the display panel 130, a top chassis 140, and a bottom chassis 142. Hereinafter, the liquid crystal display 1000 according to an embodiment will be described in detail.

The display panel 130 includes a display region and a non-display region. Further, the display panel 130 may include a first substrate 132, a second substrate 131 that faces the first substrate 132, a liquid crystal layer (not illustrated), a driving portion 134 and a printed circuit board 137 attached to the first substrate 132.

The display region of the display panel 130 may mean a region where an image is displayed, and the non-display region of the display panel 130 may mean a region where the image is not displayed. In an exemplary embodiment, the display region may be positioned in a center portion of a region where the first substrate 132 and the second substrate 131 overlap each other, and the non-display region may be positioned in an edge portion of the region where the first substrate 132 and the second substrate 131 overlap each other. Further, the display region may be a region where the display panel 130 and the top chassis 140 do not overlap each other, and the non-display region may be a region where the display panel 130 and the top chassis 140 overlap each other. Further, the shape of the display region may be similar to the shape of the second substrate 131, but the internal area of the display region may be smaller than the internal area of the second substrate 131. Further, boundary lines between the display region and the non-display region may be in parallel to corresponding sides of the second substrate 131. Further, the shape of the boundary line between the display region and the non-display region may be a rectangle.

At least a part of the first substrate 132 may overlap the second substrate 131. The center portion of the region where the first substrate 132 and the second substrate 131 overlap each other may be the display region, and the edge portion of the region where the first substrate 132 and the second substrate 131 overlap each other may be the non-display region. The driving portion 134 and the printed circuit board 137 may be attached to the region where the first substrate 132 and the second substrate 131 do not overlap each other.

The second substrate 131 may be arranged to face the first substrate 132. The liquid crystal layer may be interposed between the first substrate 132 and the second substrate 131. Between the first substrate 132 and the second substrate 131, a sealing member, such as sealant, may be arranged along the edge portions of the first substrate 132 and the second substrate 131 to adhere and seal the first substrate 132 and the second substrate 131.

The first substrate 132 and the second substrate 131 may be in a cuboidal shape. For convenience in explanation, it is illustrated that the first substrate 132 and the second substrate 31 are in a cuboidal shape, but are not limited thereto. The first substrate 132 and the second substrate 131 may be manufactured in various shapes depending on the shape of the display panel 130.

The driving portion may apply various signals, such as driving signals required to display an image on the display region. The printed circuit board 137 may output various kinds of signals to the driving portion.

On the rear surface of the display panel 130, an optical sheet 126, a diffusion plate 170, a backlight unit 300, and a bottom chassis 142 may be arranged. The position relationship between them based on the backlight unit 300 will be described again. The diffusion plate 170 and the optical sheet 126 arranged on an upper portion of the diffusion plate 170 may be arranged on an upper portion of the backlight unit 300, and the bottom chassis 142 may be arranged on a lower portion of the backlight unit 300.

The diffusion plate 170 may diffuse a part of light that is irradiated from the backlight unit 300, transfer the diffused light to the display panel 130 arranged on the upper portion of the diffusion plate 170, and reflect the other part to the lower portion of the diffusion plate 170 again. In an exemplary embodiment, the diffusion plate 170 may be formed of one material selected from the group including PMMA (Polymethyl methacrylate), PS (Polystyrene), PC (Polycarbonate), COC (Cyclo-olefin copolymers), PET (Polyethylene terephthalate), PBT (Polybutyleneterephtalate), and a plastic material alloy. However, the material of the diffusion plate 170 is not limited thereto. Further, the diffusion plate 170 may be formed as a single layer, but is not limited thereto. The diffusion plate 170 may have a stacked structure in which a plurality of layers are stacked.

On the upper portion of the diffusion plate 170, at least one optical sheet 126 for modulating the optical characteristic of the light that penetrates the diffusion plate 170 and a mold frame 141 for accommodating the optical sheet 126 may be arranged.

Here, the mold frame 141 may come in contact with the edge portion of the other surface of the display panel 130 to support and fix the display panel 130. In an exemplary embodiment, the edge portion of the other surface of the display panel 130 may be the non-display region of the display panel 130. That is, at least a part of the mold frame 141 may overlap the non-display region of the display panel 130.

The top chassis 140 may cover the edge portion of the display panel 130 and may surround a side surface of the display panel 130. The bottom chassis 142 may accommodate the optical sheet 126, the diffusion plate 170, and the backlight unit 300. The top chassis 140 and the bottom chassis 142 may be made of a conductive material, for example, metal.

Although embodiments have been described for illustrative purposes, those skilled in the art will appreciate that various modifications, additions and substitutions are possible, without departing from the scope and spirit of the inventive concept as disclosed in the accompanying claims.

What is claimed is:

1. A reflection plate comprising:
   a bottom portion;
   a side wall portion that extends from circumferences of the bottom portion; and
   a light source portion disposed on the bottom portion,
   wherein an upper surface of the bottom portion includes a diffusion reflection surface and an inner surface of the side wall portion includes a mirror reflection surface, the diffusion reflection surface being configured to reflect incident light to multiple directions whereas the mirror reflection surface is configured to reflect the incident light to one direction, wherein the side wall portion comprises a first side wall and a second side wall that face each other,
   wherein the first side wall and the second side wall comprise a first sub-side wall that extends upwardly from the circumferences of the bottom portion and a second sub-side wall that extends from an upper end of the first sub-side wall,
   wherein the entire upper surface of the bottom portion and the entire inner surface of the first sub-side wall is the diffusion reflection surface and the entire inner surface of the second sub-side wall is the mirror reflection surface, and
   wherein a third angle, which is an internal angle that is formed by an extension line of the inner surface of the second sub-side wall and the upper surface of the bottom portion, are defined, and the third angle is a right angle.

2. The reflection plate of claim 1, wherein the inner surface of the first sub-side wall is white, and the inner surface of the second sub-side wall comprises silver or aluminum.

3. The reflection plate of claim 1, wherein the side wall portion further comprises a third side wall and a fourth side wall that face each other, and both ends of the third side wall and the fourth side wall come in contact with both ends of the first side wall and the second side wall.

4. A backlight unit comprising:
   a reflection plate including a bottom portion and a side wall portion that extends from circumferences of the bottom portion; and
   a light source portion arranged on an upper portion of the reflection plate,
   wherein an upper surface of the bottom portion includes a diffusion reflection surface and an inner surface of the side wall portion includes a mirror reflection surface, the diffusion reflection surface being configured to reflect incident light to multiple directions whereas the mirror reflection surface is configured to reflect the incident light to one direction, wherein the side wall portion comprises a first side wall and a second side wall that face each other,
   wherein the first side wall and the second side wall comprise a first sub-side wall that extends upwardly from the circumferences of the bottom portion and a second sub-side wall that extends from an upper end of the first sub-side wall,
   wherein the entire upper surface of the bottom portion and the entire inner surface of the first sub-side wall is the diffusion reflection surface and the entire inner surface of the second sub-side wall is the mirror reflection surface, and
   wherein a third angle, which is an internal angle that is formed by an extension line of the inner surface of the second sub-side wall and the upper surface of the bottom portion, are defined, and the third angle is a right angle.

5. The backlight unit of claim 4, wherein the light source portion comprises side surface light emission type light sources.

6. The backlight unit of claim 4, wherein the light source portion is configured to irradiate light such that the light that is irradiated from the light source portion to the inner surface of the side wall portion is mirror-reflected, and the light that is irradiated from the light source portion to the upper surface of the bottom portion is diffusion-reflected.

7. The backlight unit of claim 4, wherein the inner surface of the first sub-side wall is white, and the inner surface of the second sub-side wall comprises silver or aluminum.

8. The backlight unit of claim 4, wherein the side wall portion further comprises a third side wall and a fourth side wall that face each other, and both ends of the third side wall and the fourth side wall come in contact with both ends of the first side wall and the second side wall.

9. A liquid crystal display comprising:
   a backlight unit including a reflection plate and a light source portion arranged on an upper portion of the reflection plate;
   a diffusion plate arranged on an upper portion of the backlight unit; and
   a display panel arranged on an upper portion of the diffusion plate,
   wherein the reflection plate includes a bottom portion and a side wall portion that extends from circumferences of the bottom portion, and an upper surface of the bottom portion includes a diffusion reflection surface and an inner surface of the side wall portion includes a mirror reflection surface, the diffusion reflection surface being configured to reflect incident light to multiple directions whereas the mirror reflection surface is configured to reflect the incident light to one direction, wherein the side wall portion comprises a first side wall and a second side wall that face each other, wherein the first side wall and the second side wall comprise a first sub-side wall that extends upwardly from the circumferences of the bottom portion and a second sub-side wall that extends from an upper end of the first sub-side wall, wherein the entire upper surface of the bottom portion and the entire inner surface of the first sub-side wall is the diffusion reflection surface and the entire inner surface of the second sub-side wall is the mirror reflection surface, and wherein a third angle, which is an internal angle that is formed by an extension line of the inner surface of the second sub-side wall and the upper surface of the bottom portion, are defined, and the third angle is a right angle.

10. The liquid crystal display of claim 9, wherein the light source portion is configured to irradiate light such that the light that is irradiated from the light source portion to the inner surface of the side wall portion is mirror-reflected, and light that is irradiated from the light source portion to the upper surface of the bottom portion is diffusion-reflected.

\* \* \* \* \*